United States Patent [19]

Iwasaki et al.

[11] Patent Number: 5,055,649
[45] Date of Patent: Oct. 8, 1991

[54] WIRE ELECTRODE SUPPLYING DEVICE IN WIRE CUT ELECTRIC DISCHARGE MACHINE

[75] Inventors: Takeshi Iwasaki; Hiroshi Takeuchi, both of Aichi, Japan

[73] Assignee: Mitsubishi Denki K.K., Tokyo, Japan

[21] Appl. No.: 494,331

[22] Filed: Mar. 16, 1990

[30] Foreign Application Priority Data

May 24, 1989 [JP] Japan .................. 1-131036

[51] Int. Cl.⁵ .................................. B23H 7/02
[52] U.S. Cl. .................................. 219/69.12
[58] Field of Search ............ 219/69.12, 69.13, 69.14, 219/69.16, 69.17

[56] References Cited

U.S. PATENT DOCUMENTS

| 3,891,819 | 6/1975 | Ullmann et al. | 219/69.17 |
| 4,547,647 | 10/1985 | Schneider | 219/69.12 |
| 4,827,213 | 5/1989 | Spaude | 219/69.16 |

FOREIGN PATENT DOCUMENTS

| 56-119327 | 9/1981 | Japan | 219/69.17 |
| 0120920 | 6/1987 | Japan | . |
| 63-62614 | 3/1988 | Japan | . |
| 63-41697 | 8/1988 | Japan | . |
| 64-51229 | 2/1989 | Japan | 219/69.12 |
| 1-135424 | 5/1989 | Japan | 219/69.12 |

Primary Examiner—Geoffrey S. Evans
Attorney, Agent, or Firm—Sughrue, Mion, Zinn, Macpeak & Seas

[57] ABSTRACT

In a wire electrode supplying device, a contact detector detects when a wire electrode supplied through a wire guide is brought into contact with the upper surface of a workpice, to output a detection signal, and in response to the detection signal, a control unit operates to suspend the supplying of the wire electrode and to insert it into a machining start hole formed in the workpiece while binding it with a jet stream, whereby the wire electrode is positively inserted into the machining start hole even when the wire guide is remote from the workpiece.

6 Claims, 6 Drawing Sheets

| LOCUS OF | $P_0 \rightarrow P_1 \rightarrow P_5$ |
|---|---|
| RFLAVENT | $P_0 \rightarrow P_2 \rightarrow P_6$ |
| MOTION | $P_0 \rightarrow P_3 \rightarrow P_7$ |
| | $P_0 \rightarrow P_4 \rightarrow P_8$ |
| | $P_0$ |

FIG. 6

WIRE ELECTRODE SUPPLYING DEVICE IN WIRE CUT ELECTRIC DISCHARGE MACHINE

BACKGROUND OF THE INVENTION

This invention relates to a wire electrode supplying device in a wire cut electric discharge machine.

Figure 3:
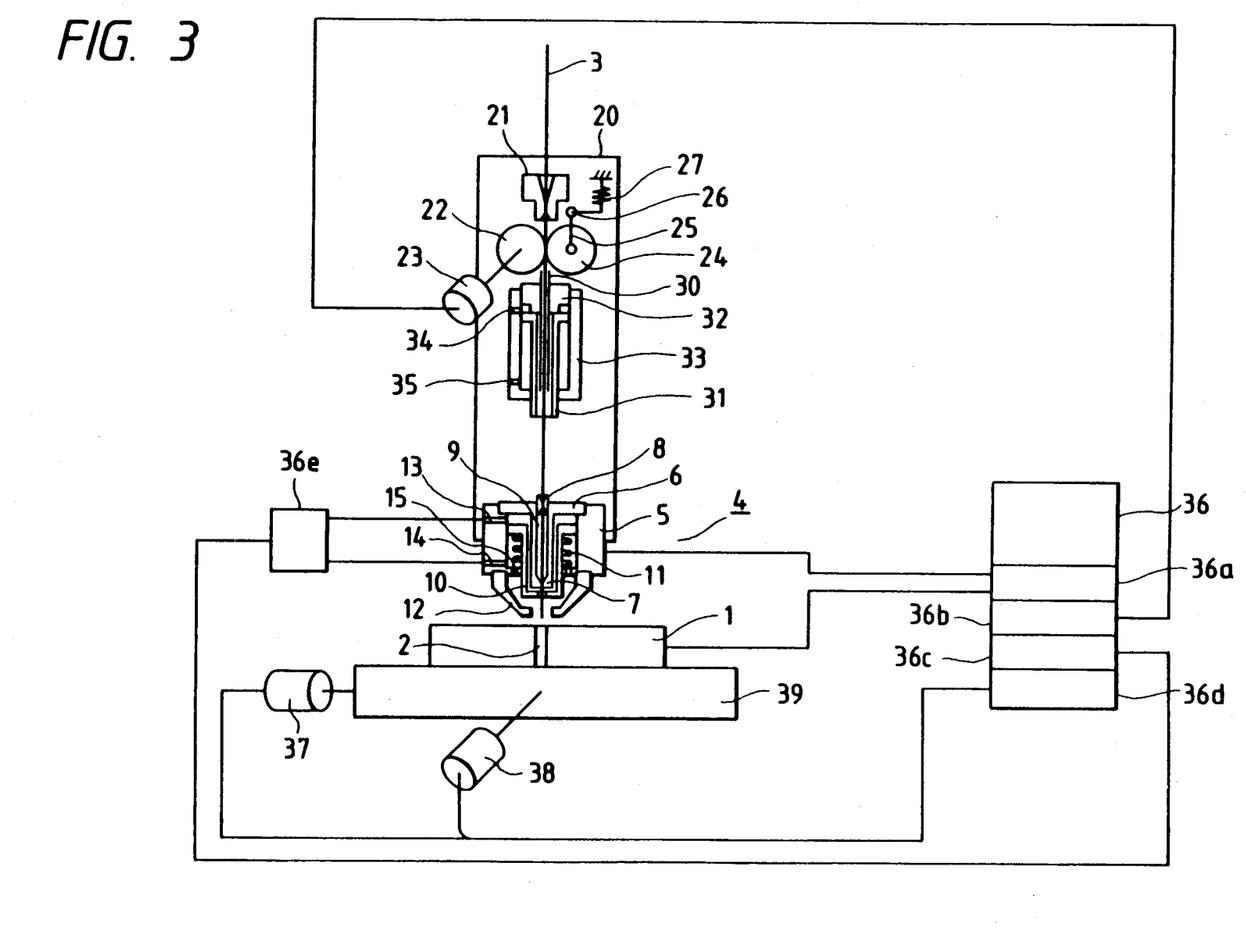
FIG. 3 is an explanatory diagram showing the arrangement of a conventional wire electrode supplying device in a wire cut electric discharge machine.
Figure 4A:
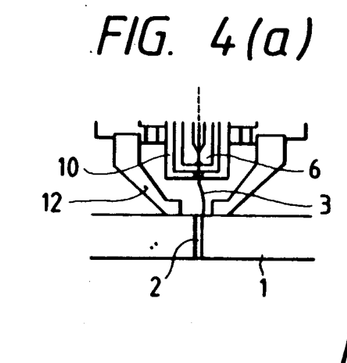
Figure 4B:
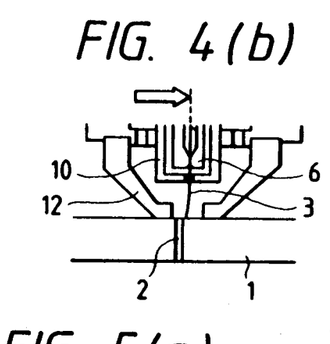
Figure 4C:
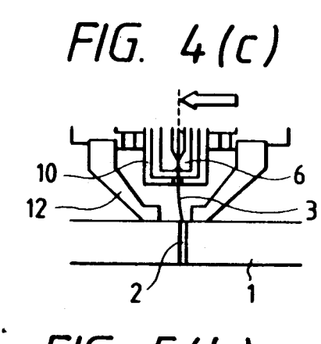
Figure 4D:
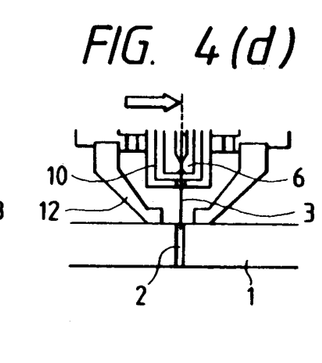

FIG. 3 shows a conventional wire electrode supplying device which is disclosed by Japanese Patent Application Publication Nos. 10130/1981 and 47134/1987 for instance. In the conventional device, a wire electrode supplying wire guide section and a wire electrode receiving wire guide section are provided on both sides of a workpiece to be machined, and a wire electrode is conveyed from the former wire guide to the latter wire guide while being bound by a jet water stream. The device will be described in more detail.

In FIG. 3, reference numeral 1 designates a workpiece to be machined; 2, a machining start hole formed in the workpiece; 3, a wire electrode; 4, wire electrode supplying wire guide section; 5, a supporting member; 6, an upper wire guide having a die guide 7 at the top which provides a narrow space for the wire electrode 3; 8, a guide die; and 9, an electric feeder built in the upper wire guide. The wire electrode 3 is supported by the guide die 8 and the die guide 7 on both sides of the electric feeder 9 in such a manner that it is extended along the central axis of the wire supplying wire guide section 4. Hence, the wire electrode 3 is brought into contact with the electric feeder 9 while being strongly rubbed thereby.

Further in FIG. 3, reference numeral 10 designates a jet nozzle having a small hole at the center of its inner bottom which is coaxial with the wire electrode 3, the jet nozzle 10 being vertically slidably provided in the supporting member 5; 11, a compression spring interposed between the jet nozzle 10 and the supporting member 5, the compression spring 11 normally urging the jet nozzle 10 upwardly so that a small gap is formed between the inner bottom surface of the jet nozzle 10 and the lower end face of the upper wire guide 6; 12, a machining solution jetting nozzle; and 13, 14 and 15, machining solution introducing paths. When the machining solution is introduced through the machining solution introducing path 13, it is filled in the chamber which is defined by the supporting member 5 and the inside of the jet nozzle 10. As a result, downward force is applied to the flange upper surface and the inner bottom surface of the jet nozzle 10, so that the jet nozzle 10 is moved downwardly against the elastic force of the compression spring 11. When the machining solution is supplied through the machining solution introducing path 14, it is filled in the chamber which is defined by the supporting member 5 and the outside of the jet nozzle 10 and then filled in the machining solution jetting nozzle 12 through the machining solution introducing path 15, as a result of which the machining solution is jetted towards the workpiece 1 through the opening of the machining solution jetting nozzle 12.

Further in FIG. 3, reference numeral 20 designates a mounting board; 21, a guide die; 22, a capstan roller; 23, a DC motor for driving the capstan roller 22; 24, a pinch roller which is swingably mounted on the mounting board 20 through a supporting arm 25 and a mounting shaft 26; 27, a compression spring interposed between the supporting arm 25 and the mounting board 20 so as to urge the pinch roller 24 against the capstan roller 22 at all times; 30 and 31, guide pipes; 32, a guide pipe holder; and 33, a cylinder block. The guide pipe 30 is secured through the guide pipe holder 32 to the cylinder block 33. The upper portion of the guide pipe 31 is formed into a flange. The guide pipe 31 is fitted in the cylinder block 33 in such a manner that it is vertically slidable and surrounds the other guide pipe 30 with a predetermined gap therebetween. The cylinder block 33 has air flow-in paths 34 and 35 through which air is supplied by an air supplying unit (not shown) to move the guide 31 pipe up and down.

Further in FIG. 3, reference character 36a designates a contact detecting means provided on an NC (numerical control) unit 36 for detecting whether or not the wire electrode 3 is in contact with the workpiece 1. The contact detecting means operates as follows. It applies DC voltage across the wire electrode 3 and the workpiece 1, and compares the interelectrode voltage with a reference voltage. When the interelectrode voltage is lower than the reference voltage, it is determined that the wire electrode is in contact with the workpiece. Further in FIG. 3, reference character 36b designates a wire supplying controlling means provided on the NC unit 36, for controlling the DC motor 23; 36c, a machining solution controlling means provided on the NC unit 36, for supplying a machining solution from a machining solution supplying unit 36e to the machining solution introducing path 13 and 14; and 36d, a table drive controlling means provided on the NC unit 36, for operating an X-axis drive motor 37 and a Y-axis drive motor 38 to move an X-Y cross table 39, thereby to move the wire electrode 3 and the machining start hole 2 relative to each other.

Now, the operation of the wire electrode supplying device thus constructed will be described.

In the case where the diameter of the machining start hole 2 is larger than the diameter (usually of the order of 1 to 1.5 mm) of the jet stream, the operation of supplying the wire electrode 3 is as follows: Air is allowed to flow in the cylinder block 33 through the air flow-in path 34 to pressurize the upper surface of the flange of the guide pipe 31, so that the latter 31 is lowered to the lower limit position. As a result, the region from the guide pipe 30 to the guide die 8 is closed. At the same time, the machining solution supplying unit 36e supplies machining solution through the machining solution flow-in path 13 into the supporting member 5. In this operation, the flange of the jet nozzle 10 is pressurized by the machining solution thus supplied, so that the jet nozzle 10 is lowered. As a result, the opening of the jet nozzle is sufficiently spaced away from the wire guide on the wire electrode supplying side, so that the machining solution is jetted straightly through the opening of the jet nozzle 10, to convey the wire electrode 3 to the wire guide section on the wire electrode receiving side (not shown). The wire electrode has been cut with a conventional wire electrode cutting mechanism (not shown) which has been disclosed by Japanese Patent Application (OPI) No. 80528/1985 (the term "OPI" as used herein means an "unexamined published application"). The front end of the wire electrode has been positioned in the guide pipe 31 above the guide die 8. After the guide pipe 31 has been lowered, the wire electrode supplying motor 23 is started to rotate the capstan roller 22 and the pinch roller 24, whereby the wire electrode is conveyed towards the wire guide section 4 on the wire electrode supplying side; that is, the wire electrode is passed through the guide die 8, the upper wire guide and the jet nozzle 10 in the stated order. The wire electrode, being bound by the jet stream, is further passed through the machining start hole 2, and the wire guide section on the wire electrode receiving side (not shown), and it is conveyed by fluid, belt or roller means in a wire take-up mechanism so that it is wound on a roller, or set in a predetermined container. Thus, the wire cut electric discharge machining operation can be started.

Figure 5A:
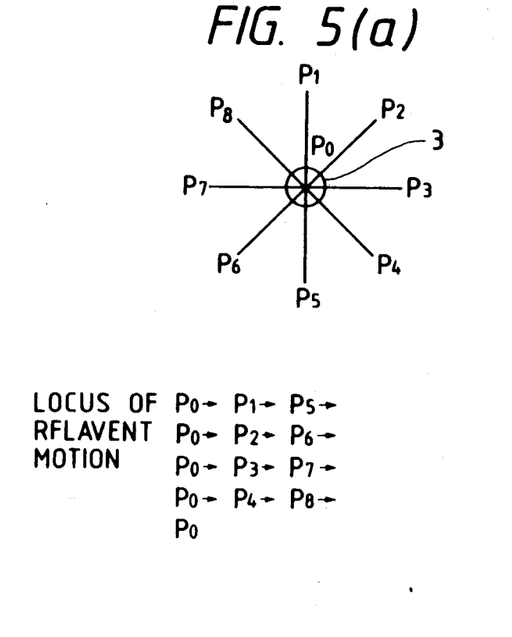
Figure 5B:
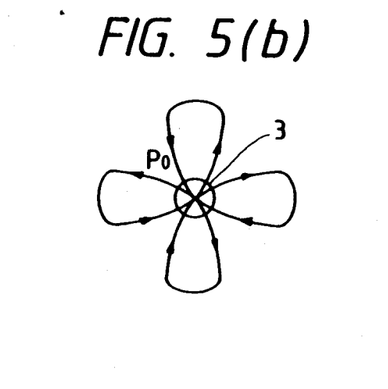

Now, an operation of supplying the wire electrode in the case where the diameter of the machining start hole is smaller than the diameter (for instance of the order of 0.5 mm) of the jet stream will be described with reference to FIGS. 4 and 5. The parts (a) through (d) of FIG. 4 are explanatory diagrams showing the states and movements of the wire electrode 3 in the wire electrode supplying operation, and the parts (a) and (b) of FIG. 5 are explanatory diagrams for a description of one example of the locus of relative motion of the wire electrode 3 and the workpiece 1.

In FIG. 3, the wire electrode 3 is conveyed towards the workpiece 1 on the X-Y cross table 39, while the machining solution supplying unit 36e supplies the machining solution through the machining solution flow-in path 14 into the machining solution jetting nozzle 12, so that the machining solution is jetted towards the workpiece 1. The jet stream cleans the machining start hole 2, and tensions the wire electrode 3 so that the latter 3 is straightly conveyed. If the front end of the wire electrode 3 is not led into the machining start hole 2; that is, if it is brought into contact with the upper surface of the workpiece 1, then the contact detecting means 36a applies the contact detection signal to the NC unit 36. In response to the contact detection signal, the NC unit 36 applies instruction signals to the wire supplying control means 36b and the machining solution supplying controlling means 36c. In response to the instruction signals, the wire supplying control means 36b stops the supplying of the wire electrode 3 with delay time provided by its delay means or with delay time provided originally for the control means 36b, while the machining solution control means 36c stops the jetting of the machining solution through the machining solution jetting nozzle 12. The parts (a) of FIG. 4 shows the state that the supplying of the wire electrode 3 is stopped. That is, the wire electrode 3 is slightly slackened so that it is positively inserted into the machining start hole later. Under this condition, the NC unit 36 outputs an instruction signal to cause the X-Y table driving controlling means 36d to start the electrode inserting operation. In response to the instruction signal, the X-Y table drive controlling means 36d drives the X- axis drive motor 37 and/or the Y-axis drive motor 38, to move the upper wire guide 6 and the machining start hole 2 relative to each other as shown in the parts (a) through (d) of FIG. 4. The part (a) of FIG. 4 shows the state that, with the front end of the wire electrode in contact with the right side of the machining start hole 2, the supplying of the wire electrode is stopped. When the machining start hole 2 is moved relative to the upper wire guide right and left as shown in the parts (b) and (c) of FIG. 4, then the front end of the wire electrode 3 is also moved right and left while being in contact with the upper surface of the workpiece 1, as a result of which the front end of the wire electrode 3 is inserted into the machining start hole 2 without fail as shown in the part (d) of FIG. 4. The relative movement of the wire electrode 3 and the machining start hole 2 is as shown in the parts (b) of FIG. 5. That is, the relative movement is carried out from a movement start point $P_0$ in a plurality of directions, so that the wire electrode 3 can be inserted into the machining start hole 2 no matter where the wire electrode is brought into contact with the periphery of the machining start hole 2. The relative movement is limited in a predetermined range (within in a several millimeters from the movement start point $P_0$) so as to prevent the difficulty that the wire electrodes front end thus inserted is pulled out of the machining start hole 2.

When the front end of the wire electrode 3 has been positively inserted into the machining start hole 2 as was described above, the contact detecting means 36a provides an output signal indicating the fact that the wire electrode 3 is not in contact with the workpiece 1. In response to the output signal, the X-Y table drive control means 36d stops the X-Y cross table 39. In response to the same output signal, the wire supplying controlling means 36b drives the wire electrode supplying motor 23 to supply the wire electrode 3 again, while the machining solution supplying controlling means 36c operates to jet the machining solution through the machining solution jetting nozzle 12. Thereafter, the wire electrode 3 is passed through the machining start hole 2, and is then conveyed through the wire guide section on the wire electrode receiving side (not shown) and the wire take-up mechanism in the stated order. Thus, the wire supplying operation has been accomplished.

Figure 6:
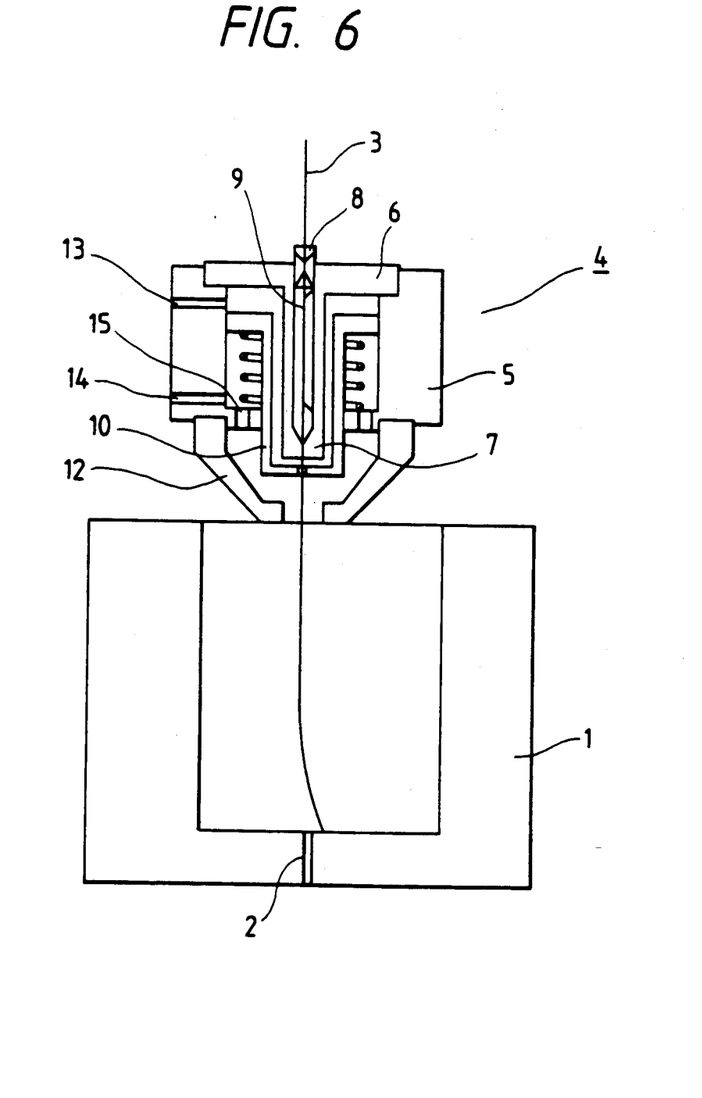
FIGS. 6, 7(a), (b) and (c) are explanatory diagrams for a description of difficulties accompanying the conventional wire electrode supplying device.
Figure 7A:
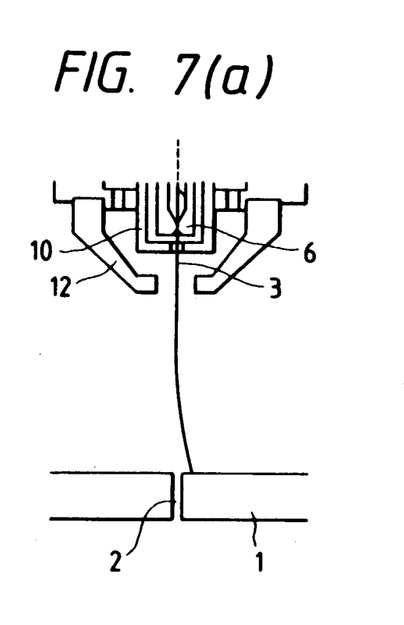
Figure 7B:
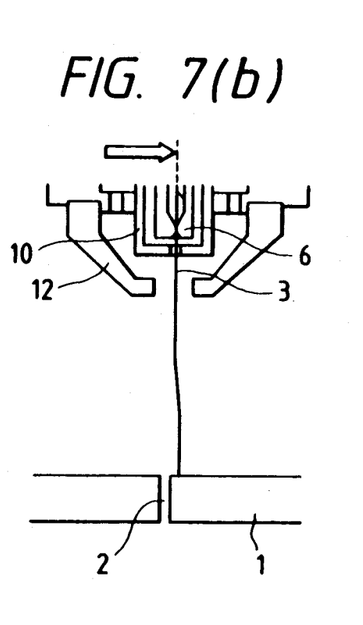
Figure 7C:
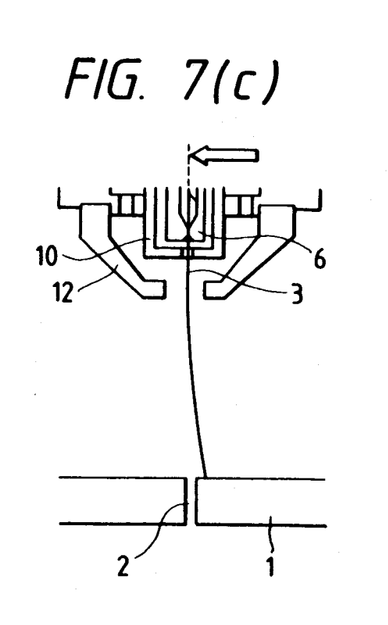

The conventional wire electrode supplying device in the wire cut electric discharge machine is constructed as described above. The machining solution jetting nozzle 12 is preferably so positioned that the machining solution is supplied to the machining region under high pressure to efficiently remove the waste material formed during machining thereby to increase the machining rate. In addition, it is also preferable to set the wire guides closer to the workpiece 2, because the amplitude of vibration of the wire electrode between the wire guides can be reduced as much, with the results that the machining accuracy and the machining rate can be increased. However, depending on the configuration of a workpiece 1 and the configuration of a jig holding the workpiece 1, sometimes the machining solution jetting nozzle 12 is positioned away from the workpiece 1 so that the jetting nozzle 12 may not interfere with the workpiece 1 or the jig during machining. If, in inserting the wire electrode 3 into a machining start hole small in diameter (for instance of the order of 0.5 mm) under this condition, the distance between the machining solution jetting nozzle 12 and the workpiece 1 is large as shown in FIG. 6, then the curl of the wire electrode 3 cannot be sufficiently straightened up with the jet stream from the machining solution jetting nozzle 12. In addition, since the opening of the machining solution jetting nozzle 12 is generally of the order of from 4 mm to 10 mm in diameter, it is impossible to bind the wire electrode's front end in the narrow range thereby to convey it to the workpiece 1. Hence, sometimes the wire electrode's front end is greatly shifted from the machining start hole; that is, it is brought into contact with the workpiece, as a result of which the supplying of the wire electrode is suspended. Even if, in this case, the wire inserting operation is carried out, as is apparent from the parts (a) through (c) of FIG. 7, it is impossible to insert the wire electrode 3 into the machining start hole 2, due to the following reasons: That is, the wire electrode is greatly bent. In addition, since the upper wire guide 6 is greatly spaced from the workpiece 1, the wire electrode 3 conveyed downwardly through the upper wire guide 6 is decreased in apparent rigidity. Hence, even if the wire guide 6 is moved relative to the workpiece 1, the front end of the wire electrode will not be moved along the upper surface of the workpiece, or even if moved, the amount of movement is insufficient. Thus, the wire electrode 3 cannot be inserted into the machining start hole 2.

SUMMARY OF THE INVENTION

Accordingly, it is an object of this invention to eliminate the above-described difficulties accompanying a conventional wire electrode supplying device in a wire cut electric discharge machine.

More specifically, it is an object of the invention to provide a wire electrode supplying device for a wire cut electric discharge machine which, even when the wire guide is greatly spaced away from the workpiece, can positively insert the wire electrode into the machining start hole of the workpiece.

The foregoing object and other objects of the invention have been achieved by the provision of a wire electrode supplying device in a wire cut electric discharge machine, which, according to the invention, comprises: contact detecting means for detecting how a wire electrode supplied through a wire guide section provided on a wire electrode supplying side is brought into contact with a workpiece, to output a contact detection signal, and control means for operating in response to the contact detection signal to suspend the supplying of the wire electrode, and to insert the wire electrode into a machining start hole formed in the workpiece while allowing a jet stream to bind the wire electrode.

The principle, nature and utility of the invention will become more apparent from the following detailed description when read in conjunction with the accompanying drawings, in which like parts are designated by like reference numerals or characters.

BRIEF DESCRIPTION OF THE DRAWINGS

FIG. 2(a) to FIG. 2(d) are explanatory diagrams for a description of the insertion of a wire electrode in the wire electrode supplying device according to the invention;

FIG. 4(a) to FIG. 4(d) and FIG. 5(a) and FIG. 5(b) are explanatory diagrams for a description of the insertion of a wire electrode in the conventional wire electrode supplying device.

DETAILED DESCRIPTION OF THE INVENTION

One example of a wire electrode supplying device in a wire cut electric discharge machine according to this invention will be described with reference to the accompanying drawings.

Figure 1:
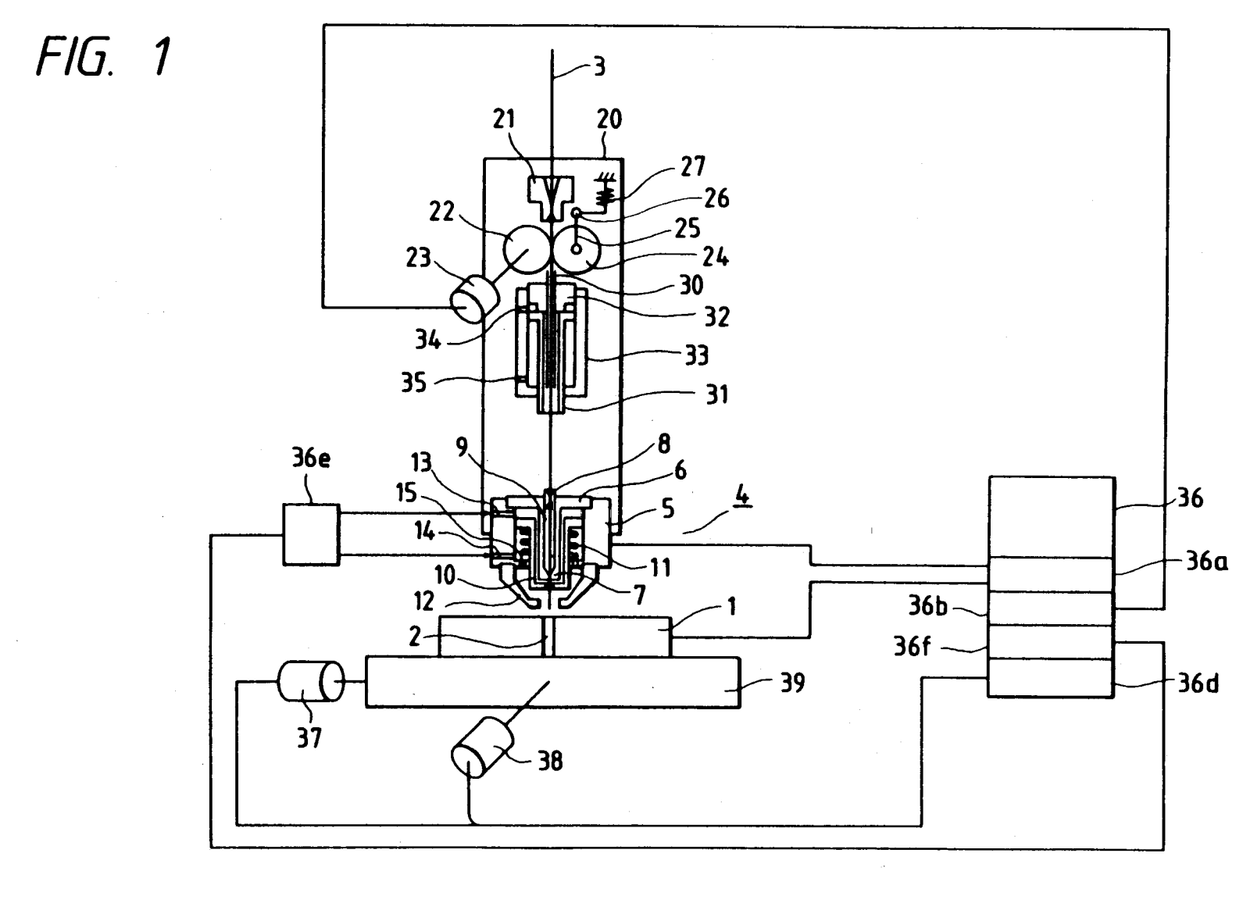
FIG. 1 is an explanatory diagram showing the arrangement of one example of a wire electrode supplying device in a wire cut electric discharge machine according to the invention.

In FIG. 1, reference character 36f designates a machining solution supply controlling means which, similarly as in the above-described conventional wire electrode supplying device, conveys a wire electrode 3 and operates according to the contact detection signal provided by a contact detecting means 36a to continuously supply a jet stream during a wire electrode inserting operation. FIG. 2 is an explanatory diagram for a description of the state and movement of the wire electrode 3 in the wire electrode supplying device according to the invention. In FIGS. 1 and 2, those components which have been already described with reference to FIG. 3 showing the conventional wire electrode supplying device are therefore designated by the same reference numerals or characters.

In FIGS. 1 and 2, the wire supply control means 36b drives the wire electrode supplying motor 23, so that the wire electrode 3 is conveyed towards the workpiece 1 on the X-Y cross table 39, while the machining solution supply controlling means 36f causes the machining solution supplying unit 36e to supply the machining solution. The machining solution thus supplied is caused to flow through the machining solution flow-in path 13 into the jet nozzle 10, so that the machining solution is jetted as a jet stream 50 to the workpiece 1 from the jet nozzle 10.

The jet stream 50 acts to correct the curl of the wire electrode 3, and to bind the wire electrode 3 in such a manner that the latter 3 is held along the central axis of the jet stream 50. This restraint of the jet stream 50 attributes to the fluid shearing force thereof. The velocity of the jet stream 50 is higher than the speed of supplying the wire electrode 3. Therefore, the fluid shearing force is applied uniformly to all the small sections of the wire electrode 3 in the wire supplying direction, and a force proportional to the distance between the point and the front end of the wire electrode is applied to a point on the wire electrode 3, so that the wire electrode 3 on the wire electrode supplying side is pulled so as to straighten the curl of the wire electrode and the wire electrode 3 is held along the central axis of the jet stream 50. As is apparent from the above description, the wire electrode pulling force attributing to the fluid shearing force is lower at the front end portion of the wire electrode than at the other portion, and therefore the front end portion of the wire electrode is not always positioned along the central axis of the jet stream 50. However, since the diameter of the jet stream 50 is generally small, of the order of 1 mm to 1.5 mm, when the wire electrode 3 is brought into contact with the workpiece 1, the position of the front end of the wire electrode is limited in the vicinity of the machining start hole 2.

Figure 2A:
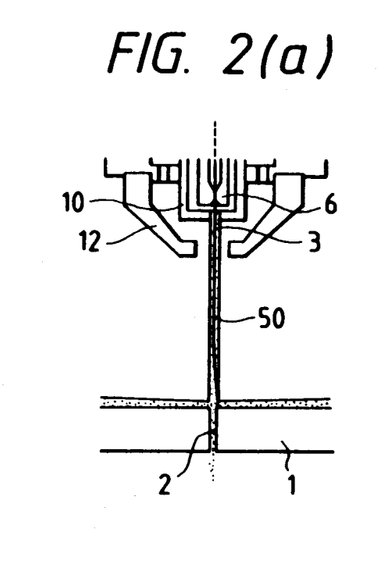
Figure 2B:
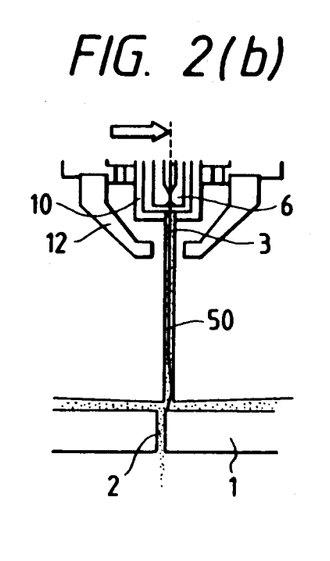
Figure 2C:
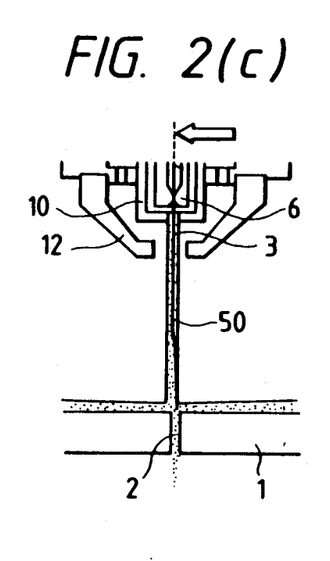
Figure 2D:
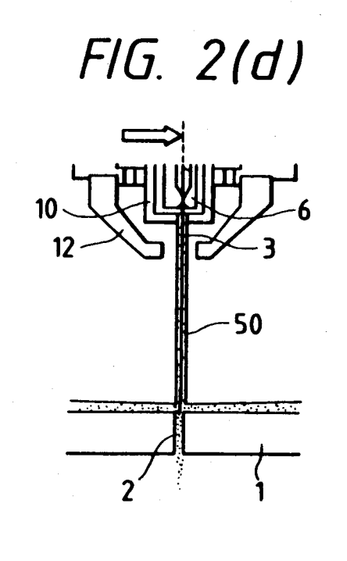

When the front end of the wire electrode 3 is brought into contact with the upper surface of the workpiece 1, the contact detecting means 36a applies a contact detection signal to the NC unit 36. In response to the contact detection signal, the NC unit 36 supplies instruction signals to the wire supply controlling means 36b and the machining solution controlling means 36f. The wire supply controlling means 36b suspends the supplying of the wire electrode 3 with delay time provided by its delay means or with delay time which is originally provided for the control means 36. On the other hand, the machining solution supply controlling means 36f maintains the jet stream 50 run from the jet nozzle 10 as it is. The part (a) of FIG. 2 shows the state that the supplying of the wire electrode 3 is suspended; that is, the front end of the wire electrode 3 is positioned near the machining start hole 1, and the wire electrode is slightly slackened so that it is positively inserted into the machining start hole 2 later.

Under this condition, the NC unit 36 applies an instruction signal to the X-Y table drive controlling means 36d to start the wire electrode inserting operation. In response to the instruction signal, the X-Y table drive controlling means 36d drives the X-axis drive motor 37 and/or the Y-axis drive motor 38, so that the X-Y cross table 39 is moved along the relative movement locus as shown in FIG. 5; that is, the upper wire guide 6 and the machining start hole 2 are moved relative to each other with the jet stream 50 from the jet nozzle 10.

The part (a) of FIG. 2 shows the state that the front end of the wire electrode is in contact with the right side of the machining start hole 2, and the supplying of the wire electrode 3 is suspended. As the relative movement is carried out as shown in the parts (b) and (c) of FIG. 2, the front end of the wire electrode 3 is moved right and left by the restraint of the jet stream while being kept in contact with the upper surface of the workpiece 2, so that the front end of the wire electrode is inserted into the machining start hole 2 without fail. Thereafter, the wire electrode is conveyed downwardly along the machining start hole. That is, the machining solution supply controlling means 36f operates to provide the jet stream 50 straightly downwardly through the machining start hole 2 by jetting the machining solution from the jet nozzle 10. Thus, similarly as in the conventional wire electrode supplying device, the wire electrode supplying operation is carried out, so that the wire electrode 3, after passing through the machining start hole 2, is conveyed to the wire guide section on the wire electrode receiving section (not shown) and the wire take-up mechanism in the stated order. Thus, the wire supplying operation has been accomplished.

In the above-described embodiment, the jet stream 50 is jetted from the jet nozzle 10. However, the machining solution jetting nozzle 12 may be so modified that its opening is smaller in diameter to form the jet stream 50. In this case, the machining solution jetting nozzle 12 for wire cut electric discharge machining may serve also as the wire electrode supplying jet nozzle.

In the above-described embodiment, the jet stream for binding the wire electrode 3 is of water; however, the invention is not limited thereto or thereby. That is, the same effect can be obtained by using jet streams of other liquids, or air for instance.

As was described above, in the wire electrode supplying device according to the invention, the contact detecting means detects how the wire electrode supplied through the wire guide section is brought into contact with the workpiece, to output the contact detection signal, and in response to the contact detection signal the control means operates to suspend the supplying of the wire electrode, and to insert the wire electrode into the machining start hole while allowing the jet stream to bind the wire electrode. Therefore, even if the wire guide section is remote from the workpiece, the wire electrode can be positively inserted into the machining start hole.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A wire electrode supplying device in a wire cut electric discharge machine, which comprises:
   contact detecting means for detecting when a wire electrode supplied through a wire guide section provided on a wire electrode supplying side is brought into contact with a workpiece, and for outputting a contact detection signal when said contact is detected, and
   control means to suspend the supplying of said wire electrode, and to reposition said workpiece so that said wire electrode is properly aligned for insertion into a machining start hole formed in said workpiece by allowing a jet stream to bind said wire electrode while said workpiece is being repositioned.

2. A wire electrode supplying device according to claim 1, in which a diameter of said jet stream is of the order of 1 mm to 1.5 mm.

3. A wire electrode supplying device according to claim 1, further comprising a jet nozzle means, coupled to said control means, for supplying said jet stream during repositioning.

4. A wire electrode supplying device according to claim 1, wherein said detecting means does not output a detection signal when the starting hole is properly aligned with said wire electrode, and said control means terminates repositioning of said workpiece when said detection signal is not received.

5. A wire electrode supplying device according to claim 1, further comprising a repositioning means for moving said workpiece in a locus of relative movement when said contact detection signal is detected.

6. A method for supplying a wire electrode in a wire cut electric discharge machine, comprising the steps of:
   supplying a wire electrode through a wire guide section;
   detecting when said wire electrode is in contact with a workpiece;
   suspending the supplying of said wire electrode when said contact is detected;
   repositioning said workpiece so that said wire electrode is properly aligned for insertion into a machining start hole formed in said workpiece; and
   supplying a jet stream to bind said wire electrode during said repositioning step.

* * * * *